Nov. 16, 1954     J. H. DULLIGAN     2,694,261
HOLE GAUGE
Filed Nov. 5, 1953     2 Sheets-Sheet 1
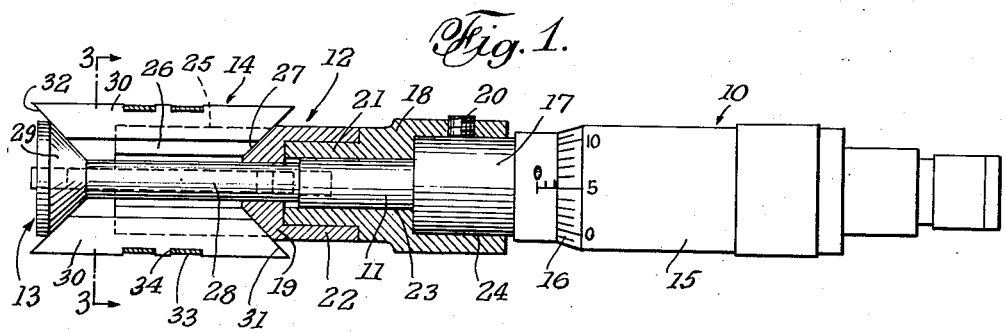
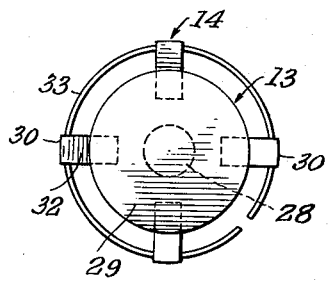
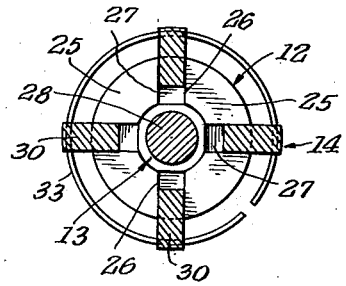
Inventor
JOHN H. DULLIGAN
By C. G. Stratton
Attorney Nov. 16, 1954  J. H. DULLIGAN  2,694,261
HOLE GAUGE
Filed Nov. 5, 1953  2 Sheets-Sheet 2
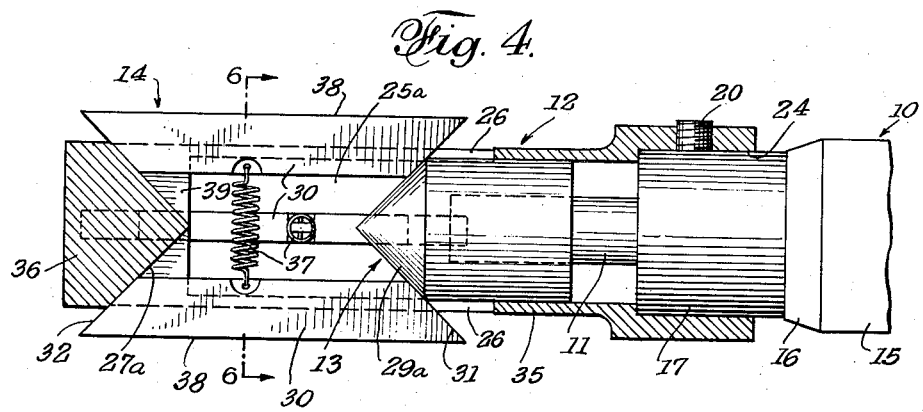
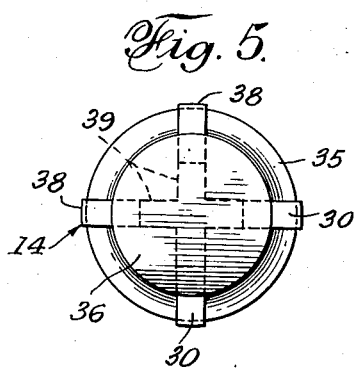 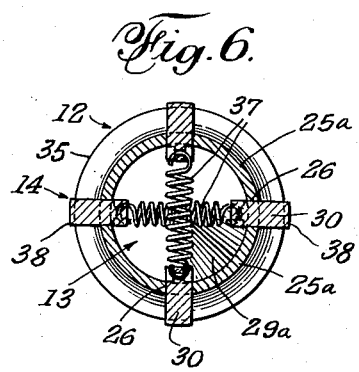
Inventor
JOHN H. DULLIGAN
By C. G. Stratton
Attorney

United States Patent Office 2,694,261
Patented Nov. 16, 1954

2,694,261
HOLE GAUGE
John H. Dulligan, Downey, Calif.

Application November 5, 1953, Serial No. 390,368

9 Claims. (Cl. 33—178)

This invention relates to measuring devices and deals more particularly with a device for measuring internal diameters.

This application is a continuation in part of my pending applications, Serial No. 195,219, filed November 13, 1950, which matured into Patent No. 2,661,540, dated December 8, 1953, and Serial No. 239,151, filed July 28, 1951, the latter having been abandoned subsequent to the filing of this application.

The inspection of small holes such as drilled and small reamed holes, at the present time, entails the use of a multiplicity of expensive gauges of the "go-no go" type, even when the range of hole sizes is relatively small. These latter sizes range between .234" and .413" and, while not intended as limiting, indicate the general range contemplated for the present gauge.

Accordingly, it is an object of the present invention to provide a hole gauge more particularly adapted to measure relatively small holes, as above indicated, in a manner to expedite inspection and reducing any associated expense.

Whereas prior devices depended on oppositely directed pins to gauge an internal diameter, the same, unless considerable time was used to effect at least two gauging operations for each hole, would give inaccurate readings if the hole were not truly round. Also, if such prior tools were not squarely entered into a hole, the angle of presentation to the hole would affect the reading. A further object of the invention, therefore, is to provide a hole gauge that automatically centers and squares itself in the hole being gauged and, at all times, will give the same reading regardless of the "out-of-round" condition of the hole.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes two preferred embodiments of the present invention, which are given by way of illustration or example only.

In the drawings, like reference characters designate similar parts in the several views.

Fig. 1 is a longitudinal sectional view of a hole gauge according to the present invention, and embodying a conventional micrometer head, the latter being shown in elevation.

Fig. 2 is an enlarged end view of said gauge.

Fig. 3 is a similarly enlarged cross-sectional view on line 3—3 of Fig. 1.

Fig. 4 is a view similar to Fig. 1, with a portion of the micrometer head broken away, of another form of hole gauge.

Fig. 5 is an end view thereof.

Fig. 6 is an enlarged cross-sectional view as taken on line 6—6 of Fig. 4.

Each gauge that is illustrated comprises, generally, a micrometer head 10 having a stem 11, a body 12 fixedly connected to said head, cone means 13 carried by the stem, and a set of gauge pieces 14 guided in the body and operatively engaged between the same and the cone means.

The micrometer head is generally conventional and comprises a barrel 15 from the graduated end 16 of which fixedly extends stem 11. While not shown, the stem, in that portion which is within barrel 15, is threaded and has threaded connection with sleeve 17, which is concentric with the stem. It will be clear that relative rotation of the barrel and sleeve will result in relative axial movement of said barrel and sleeve. For the purposes of this disclosure, it is assumed that sleeve 17 is fixed and that barrel 15 and stem 11 revolve and move axially with respect thereto.

In the form of Figs. 1 to 3, body 12 is shown as a two-part member of which a part 18 is affixed to sleeve 17 and a part 19 is telescopically fitted to part 18, whereby several different sizes of part 19 may be interchangeably mounted on part 18.

Part 18 is affixed to sleeve 17 by means of a set screw 20 and its projecting end 21 is reduced to fit a socket 22 formed in part 19. Part 18 has a bore 23 into which stem 11 projects, and a counterbore 24 that receives sleeve 17.

Part 19 has an external diameter that is smaller than the minimum size of a hole to be gauged and said part is formed to have a set of segments 25 that are defined by slots 26 of which four are shown, although the number may vary. At the base of said slots, body part 19 is provided with conical faces 27 which, in this case, are at 45° or on a one-to-one angle.

The cone means 13 comprises an elongated stem or rod 28 that is removably affixed to stem 11 and extends therefrom. On the other end of said rod is provided a cone 29 having a conical face equal and opposite to faces 27.

The set of gauge pieces 14 comprises elongated elements 30, arranged as opposed pairs, that slidingly fit slots 26, and each has opposite angularly directed faces 31 and 32 at the angle of the respective conical faces 27 and 29. Spring rings or bands 33 encircle gauge pieces 30 and are located by notches 34 formed in the outer edges of said gauge pieces.

When the micrometer head 10 is set at zero, the conical faces are so spaced longitudinally that split spring rings 33 will draw the gauge pieces toward each other so that the gauging diameter thereof is of minimum size. It will be clear that any rotation of barrel 15 that retracts stem 11, will draw conical face 29 toward faces 27 and result in transverse spreading movement of the gauge pieces. The gauge pieces also move longitudinally along the slope of faces 27. Because of the one-to-one slope of faces 27 and 29, each gauge piece moves transversely half the longitudinal distance that stem 11 moves and the movement across opposite gauge pieces is equal to the longitudinal movement of said stem.

It will be clear, therefore, that the gauge can be adjusted to measure holes substantially larger than the diameter of body 12 up to the limit of transverse movement of the gauge pieces.

The form of gauge illustrated in Figs. 4, 5 and 6 may employ the two-part member above described but is here shown as having a single body housing 35 in which the longitudinal slots 26 are provided. In this form the positions of the cone 29a and sloping walls or faces 27a are interchanged with respect to their positions in Fig. 1. Thus, cone member 29a is directly carried by stem 11 without the need for an extension, such as rod 28, and the body housing 35 is provided with an end 36 in which are defined walls 27a. The gauge pieces 30 are similar to those above described and are projected outwardly by movement of cone 29a toward end 36.

It will be noted that the interior of body housing 35 is unobstructed because of the omission of extension rod 28. This space is utilized to accommodate helical springs 37 which, because there are an even number of gauge pieces 30, connect the pieces that are opposed to each other. While a single spring 37 is shown connecting each of the two pairs of the four gauge pieces illustrated, two or more such springs may be used according to space limitations within the housing. Since these springs bias the gauge pieces inward toward the axis of the housing, separation of cone 29a and end 36 results in inward contraction of said gauge pieces. By this construction, the gauging edges 38 of gauge pieces 30 may be kept continuous and uninterrupted, as shown.

By providing end 36 with side walls 39 where the sloping walls 27a are formed, regardless how thin the segmental walls 25a are made, said side walls 39 constitute guides that counteract any tendency for the gauge pieces to cant. Said pieces, therefore, are maintained radial during projection and retraction thereof.

While I have illustrated and described what I now contemplate to be the best modes of carrying out my invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described the invention, what I claim and desire to be secured by Letters Patent is:

1. A hole gauge comprising a micrometer head having a fixed sleeve; a barrel rotationally and axially movable relative to said sleeve and an axially movable stem connected to said barrel and extending concentrically through said sleeve and therebeyond; an elongated body housing removably affixed to the sleeve and constituting an extension of the sleeve, said body housing being provided with an even number of circumferentially spaced longitudinal slots uniformly spaced around the circumference of said housing, said slots dividing the body housing into a like number of arcuate segments; a conical member on the end of said stem and concentric with the axis of said stem, and a wall in said body housing at one end of each said slot and disposed on a slope opposite to the slope of said conical member and in opposed spaced relation to said conical member; a set of gauge elements disposed in said slots and having sloping edges at one end in engagement with the conical member and at the other end in engagement with said sloping walls; and means interconnecting the gauge elements and biasing the same inward toward the axis of the body housing.

2. A hole-gauging attachment for a micrometer head having a sleeve and a barrel rotationally and axially movable relative to said sleeve and provided with a stem fixed to the barrel and extending concentrically through said sleeve and therebeyond, said attachment comprising an elongated body housing removably affixed to the sleeve and constituting an extension of the sleeve, said body housing being provided with an even number of circumferentially spaced longitudinal slots uniformly distributed and spaced around the circumference of said body housing, said slots dividing the body housing into a like number of arcuate segments; a conical member on the end of said stem and concentric with the axis of said stem, and a wall in said body housing at one end of each said slot and disposed on a slope opposite to the slope of said conical member and in opposed spaced relation to said conical member; a set of gauge elements disposed in said slots and having sloping edges at one end in sliding engagement with the conical member and at the other end in engagement with said sloping walls; and means interconnecting the gauge elements and biasing the same inward toward the axis of the body housing.

3. A hole-gauging attachment according to claim 2 in which said means interconnecting the gauge elements comprise helical springs disposed within the body housing and connecting said elements in opposed pairs.

4. A hole-gauging attachment according to claim 2 in which said means interconnecting the gauge elements comprise helical springs disposed within the body housing, each spring connecting two opposed gauge elements of the even number of such elements disposed in said even number of slots.

5. A hole gauge comprising a micrometer head having a fixed sleeve, a barrel rotationally and axially movable relative to the sleeve and an axially movable stem connected to said barrel and extending concentrically through said sleeve, an elongated body removably affixed to the sleeve and having a bore through which the stem extends, a slotted housing extending from the body and having a conical face transverse to the axis of the stem and therebeyond, an elongated rod on the stem extending beyond the end of the housing, a conical member on the end of the elongated rod and having a conical face opposed to the conical face on the housing, a set of gauge elements in the slots of the housing and having sloping end edges in sliding engagement with said conical faces, and expandable bands encircling the gauge elements and resiliently urging the same inward toward the axis of the elongated rod.

6. A hole gauge according to claim 5 in which the slope of said conical faces is a slope having one-to-one ratio, whereby the radial or transverse movement of each gauge element, upon axial movement of the stem and rod, equals one-half of said latter movement.

7. A hole gauge according to claim 5 in which said set of gauge elements is arranged in at least two opposed pairs, and the slope of said conical faces is a slope having one-to-one ratio, whereby the total radial or transverse movement of each opposed pair of elements, upon axial movement of the stem and rod, equals the latter movement.

8. A hole gauge according to claim 5 in which said body comprises two parts, one part being affixed to the sleeve of the micrometer head and provided with a reduced end, and the other part having a socket separably receiving said end.

9. A hole-gauging attachment for a micrometer head having a sleeve, a barrel rotationally and axially movable relative to said sleeve and a stem fixed to the barrel and extending concentrically through said sleeve, said attachment comprising an elongated body removably connected to the sleeve and constituting an extension of said sleeve, said body having a bore through which the stem of the micrometer head extends, said body having a set of end-open slots defining a set of segments, the base walls of said slots being sloped rearward toward the head from the inside outward to constitute a set of conical faces, an extension on the end of the mentioned stem, a conical member on the end of said extension and having a conical face sloped in opposed relation to the slope of the mentioned set of conical faces, a set of gauge elements in the slots of the body and having sloping end edges in engagement with said conical faces, and expandable band means encircling the gauge elements and resiliently urging the same inward toward the axis of the extension on the stem.

References Cited in the file of this patent

UNITED STATES PATENTS

| Number | Name | Date |
|---|---|---|
| 1,819,144 | Aulenback | Aug. 18, 1931 |
| 2,661,540 | Dulligan | Dec. 8, 1953 |
| 2,663,942 | Rudolph | Dec. 29, 1953 |